United States Patent
Wandel et al.

(10) Patent No.: US 7,986,678 B2
(45) Date of Patent: Jul. 26, 2011

(54) SYSTEM AND METHOD FOR IMPLEMENTING LOCAL BASE STATIONS

(75) Inventors: Matthias Wandel, Waterloo (CA); Gary P. Mousseau, Waterloo (CA)

(73) Assignee: Research In Motion Limited, Waterloo (CA)

(*) Notice: Subject to any disclaimer, the term of this patent is extended or adjusted under 35 U.S.C. 154(b) by 789 days.

(21) Appl. No.: 11/928,388

(22) Filed: Oct. 30, 2007

(65) Prior Publication Data

US 2008/0069064 A1    Mar. 20, 2008

Related U.S. Application Data

(63) Continuation of application No. 09/891,038, filed on Jun. 25, 2001, now abandoned.

(60) Provisional application No. 60/214,080, filed on Jun. 27, 2000.

(51) Int. Cl.
*H04W 4/00*    (2009.01)
(52) U.S. Cl. ......... 370/338; 370/312; 370/328; 370/329
(58) Field of Classification Search .................. 370/312, 370/328, 329, 338; 455/421, 560, 410–414.1; 709/206; 380/247
See application file for complete search history.

(56) References Cited

U.S. PATENT DOCUMENTS

| | | | |
|---|---|---|---|
| 5,282,250 A | 1/1994 | Dent et al. | |
| 5,825,759 A | 10/1998 | Liu | |
| 5,832,386 A | 11/1998 | Nojima et al. | |
| 5,898,679 A * | 4/1999 | Brederveld et al. | 370/315 |
| 5,898,931 A * | 4/1999 | I'Anson et al. | 455/560 |
| 5,941,947 A | 8/1999 | Brown et al. | |
| 5,958,018 A | 9/1999 | Eng et al. | |
| 5,983,099 A | 11/1999 | Yao et al. | |
| 6,049,533 A | 4/2000 | Norman et al. | |
| 6,201,962 B1 * | 3/2001 | Sturniolo et al. | 455/432.2 |

(Continued)

FOREIGN PATENT DOCUMENTS

CA    2 356 324 A1    11/1999

(Continued)

OTHER PUBLICATIONS

Wu et al., "Catching Location Data in Mobile Networking," IEEE, Oct. 6, 1993, pp. 71-76.

(Continued)

*Primary Examiner* — Hassan Kizou
*Assistant Examiner* — Toan D Nguyen
(74) *Attorney, Agent, or Firm* — Jones Day

(57) ABSTRACT

A wireless communication system includes mobile devices and a local area network. Local base stations are coupled to the local area network. Each base station has a unique address on the network and is configured to transmit and receive data packets to and from the mobile devices and to transfer the data packets between local base stations over the network using the unique address. A subscription server operates on the network. The subscription server is configured to store data identifying the unique address of the local base station covering each of the mobile devices. The subscription server is further configured to enable the local base stations to locate any one of the mobile devices. A redirection software module is configured to send and receive data packets over a wide-area wireless network to and from mobile devices that are not within range of any of the local base stations.

15 Claims, 16 Drawing Sheets

U.S. PATENT DOCUMENTS

| | | |
|---|---|---|
| 6,219,694 B1 | 4/2001 | Lazaridis et al. |
| 6,307,843 B1 | 10/2001 | Okanoue |
| 6,381,455 B1 * | 4/2002 | Smolik ..................... 455/421 |
| 6,414,962 B1 | 7/2002 | Hall et al. |
| 6,463,270 B1 | 10/2002 | Chang et al. |
| 6,487,406 B1 | 11/2002 | Chang et al. |
| 6,535,493 B1 | 3/2003 | Lee et al. |
| 6,600,734 B1 * | 7/2003 | Gernert et al. ............. 370/352 |
| 6,654,359 B1 | 11/2003 | La Porta et al. |
| 6,680,942 B2 | 1/2004 | Mead et al. |
| 6,765,896 B1 | 7/2004 | Ahmed et al. |
| 6,804,221 B1 | 10/2004 | Magret et al. |
| 7,079,499 B1 | 7/2006 | Akhtar et al. |
| 2001/0031635 A1 | 10/2001 | Bharatia |
| 2002/0109706 A1 | 8/2002 | Lincke et al. |

FOREIGN PATENT DOCUMENTS

| | | |
|---|---|---|
| EP | 0758189 A2 | 2/1997 |
| WO | 99/63709 | 12/1999 |

OTHER PUBLICATIONS

CIPO: Requisition by the Examiner (office action) for Application No. 2,414,287 dated Jun. 15, 2005 (3 pages).

EPO: Communication pursuant to Article 94(3) EPC (office action) for Application No. 07 100 352.9 - 1249 dated Apr. 15, 2008 (6 pages).

EPO: Communication pursuant to Article 94(3) EPC (office action) for Application No. 07 100 352.9 - 1249 dated Jan. 20, 2009 (6 pages).

Berger, M O et al: "Integration of DECT and OSI to support Mobile Computing Applications", IEEE 46th Vehicular Technology Conference, vol. 2, Apr. 28-May 1, 1996, pp. 1249-1253, XP010162590, Atlanta, Georgia, USA.

* cited by examiner

SYSTEM AND METHOD FOR IMPLEMENTING LOCAL BASE STATIONS

CROSS-REFERENCE TO RELATED APPLICATION

This is a continuation of U.S. patent application Ser. No. 09/891,038, filed Jun. 25, 2001 now abandoned, which claims the benefit of U.S. Provisional Application No. 60/214,080, filed Jun. 27, 2000, both applications hereby incorporated herein by reference.

FIELD OF THE INVENTION

This invention generally relates to base stations. More particularly, the invention provides a system and method for implementing a local base station for mobile devices. The invention is particularly well-suited for use in consumer-owned, local base stations for Personal Digital Assistants, wireless two-way e-mail communication devices, and the like. The invention provides utility, however, in any wireless communication system that requires a base station.

BACKGROUND

As mobile devices continue to become more and more commonplace, mobile device users are experiencing increasing congestion on wide-area wireless networks. Wireless systems cannot currently operate, however, without using this congested infrastructure. In order to send an electronic message between two mobile devices, known systems require the use of a wide-area wireless network, even if the two mobile devices are in very close proximity to one another.

FIG. 1 shows the routing of an electronic message between two mobile devices 20b and 20c using a known wireless system 10. The known system 10 includes an office 12, a wide-area wireless network 26, a wireless gateway 24, and an Internet 22. Located within the office 12 are a plurality of mobile devices 20a, 20b and 20c, a corporate LAN 14, and a plurality of personal computers ("PCs") 16a, 16b, 16c and 16d. Also accessible to the corporate LAN 14 is a redirection software module 18. This redirection software module 18 is described in detail in U.S. Pat. No. 6,219,694, which is co-owned with the present application, and which is hereby incorporated by reference.

The term "wireless network" is commonly used to refer to both data-centric and voice-centric network services. Examples of known data-centric network services include the Mobitex Radio Network ("Mobitex"), the DataTAC Radio Network ("DataTAC"), and the General Packet Radio Service ("GPRS"). In addition, there are wireless networks (operational and under development) in which both voice and data communication can be supported over the same physical network. Examples of combined data-centric/voice-centric networks include the Code Division Multiple Access (CDMA) network, the Global System for Mobile Communications (GSM), the EDGE network, and the UMTS network. For the purposes of this application, however, the term "wide-area wireless network" refers to any wireless network that supports data communications.

It should also be understood that the terms "office" and "office environment" are used throughout this application to refer to any enclosed area in which mobile devices may be used, and the terms are not limited to buildings where business is conducted.

Wide-area wireless networks 26 are typically arranged in a tiered system having at least two levels: base stations and mobile switching centers. Mobile switching centers typically include a subscriber database and a visitor database, which are used to track the location and status of mobile devices in communication with the many base stations at the bottom tier of the system. In high traffic areas, service on the wide-area wireless network 26 is often affected by congestion at both the base station and mobile switching center levels. As can be seen with reference to FIG. 1, congestion on the wide-area wireless network 26 may interrupt or delay service even if both mobile devices 20b and 20c are located in the same office 12.

FIG. 2 shows a known method of routing an electronic message between two mobile devices 20b and 20c using redirection software 18 operating on a wireless system 10. The known wireless system 10 is the same system as described with respect to FIG. 1. In this instance, however, the electronic message is communicated between wireless devices using a known redirection software module 18, such as described in U.S. Pat. No. 6,219,694. The redirection software module 18 is capable of re-routing an electronic message sent to an e-mail address on a corporate LAN 14; sending a copy of the electronic message to both the mobile device user's personal computer 16d and his or her mobile device 20b. As shown in FIG. 2, this known routing method requires access to both the wide-area wireless network 26 and the Internet 22, either of which are likely to be congested at certain times of the day.

SUMMARY

A system and method for implementing local base stations is provided. The system includes a plurality of mobile devices, a local area network (LAN), and a plurality of local base stations coupled to the LAN. Each local base station in the system has a unique address on the LAN, and is configured to transmit and receive data packets to and from the mobile devices. Using the unique address assigned to a particular local base station, the data packets may be transferred between local base stations over the LAN.

Each local base station in the system may include a central processing unit (CPU) coupled to a sound card and a network interface card, and a transmitting and receiving means that sends and receives modulated RF signals to and from the mobile devices. The sound card is configured to demodulate an incoming RF signal to produce an incoming frame of data, and to generate an outgoing modulated RF signal from an outgoing frame of data. Each local base station may also include a software module executed by the CPU and configured to extract a packet of data from the incoming RF signal and encode the packet of data into an outgoing datagram that includes addressing information enabling the outgoing datagram to be directed to another local base station over the LAN, and also configured to extract a data packet from an incoming datagram received from the LAN and encode the data packet into the outgoing frame of data that includes information enabling the outgoing frame of data to be transmitted to the mobile device.

DETAILED DESCRIPTION

Figure 1:
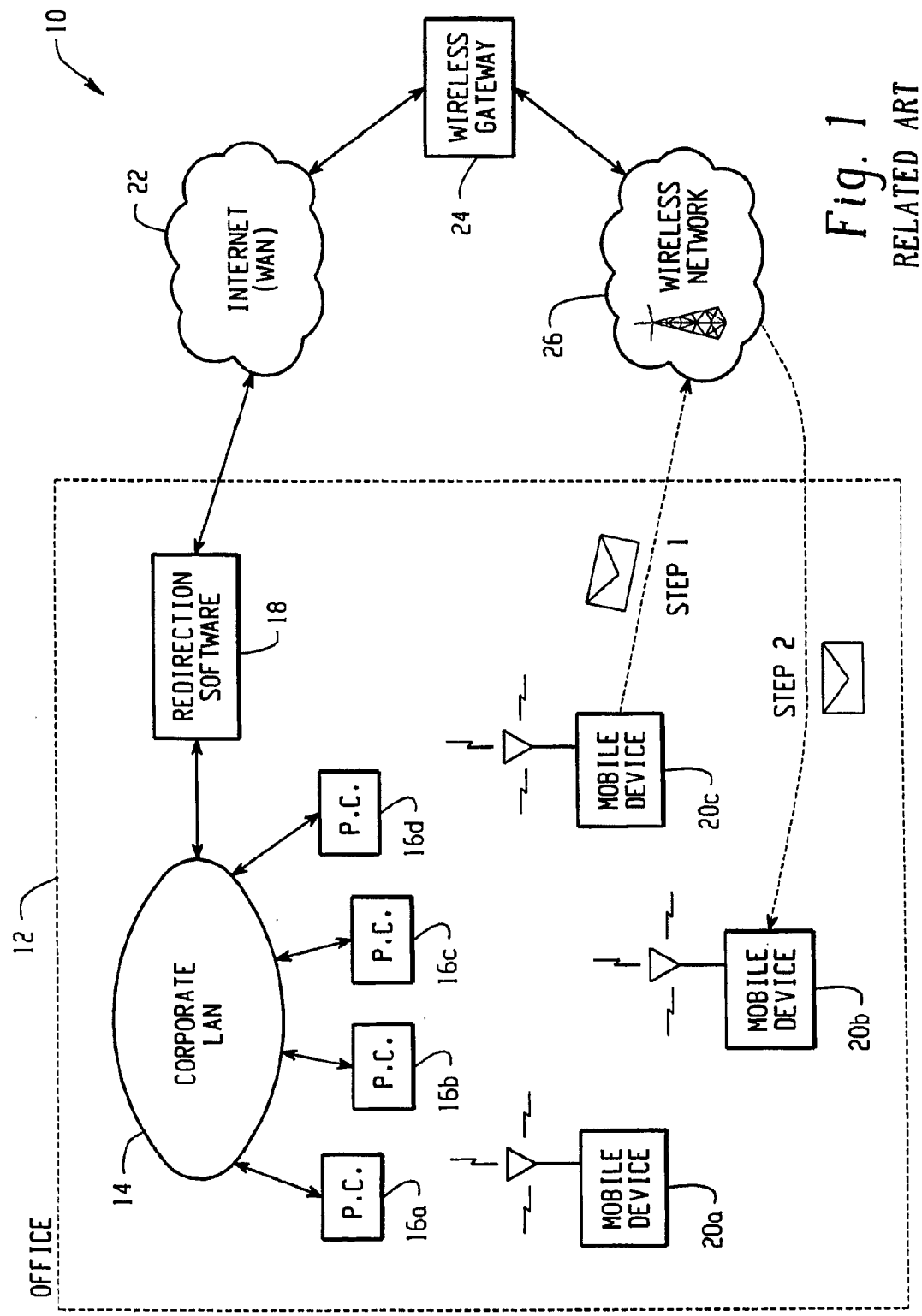
FIG. 1 shows the routing of an electronic message between two mobile devices using a known wireless system.
Figure 2:
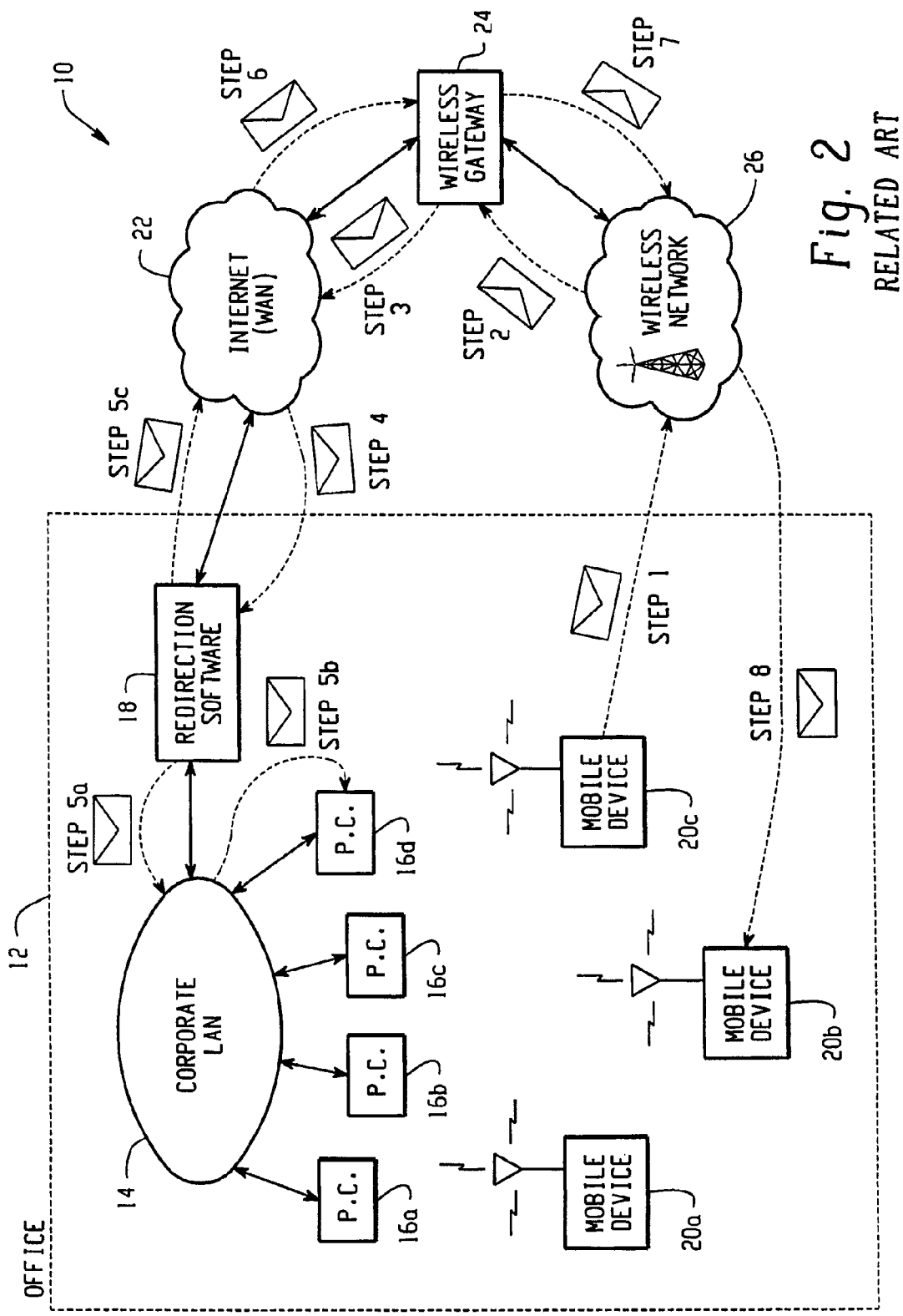
FIG. 2 shows a known method of routing an electronic message between two mobile devices using redirection software operating on a wireless system.
Figure 3:
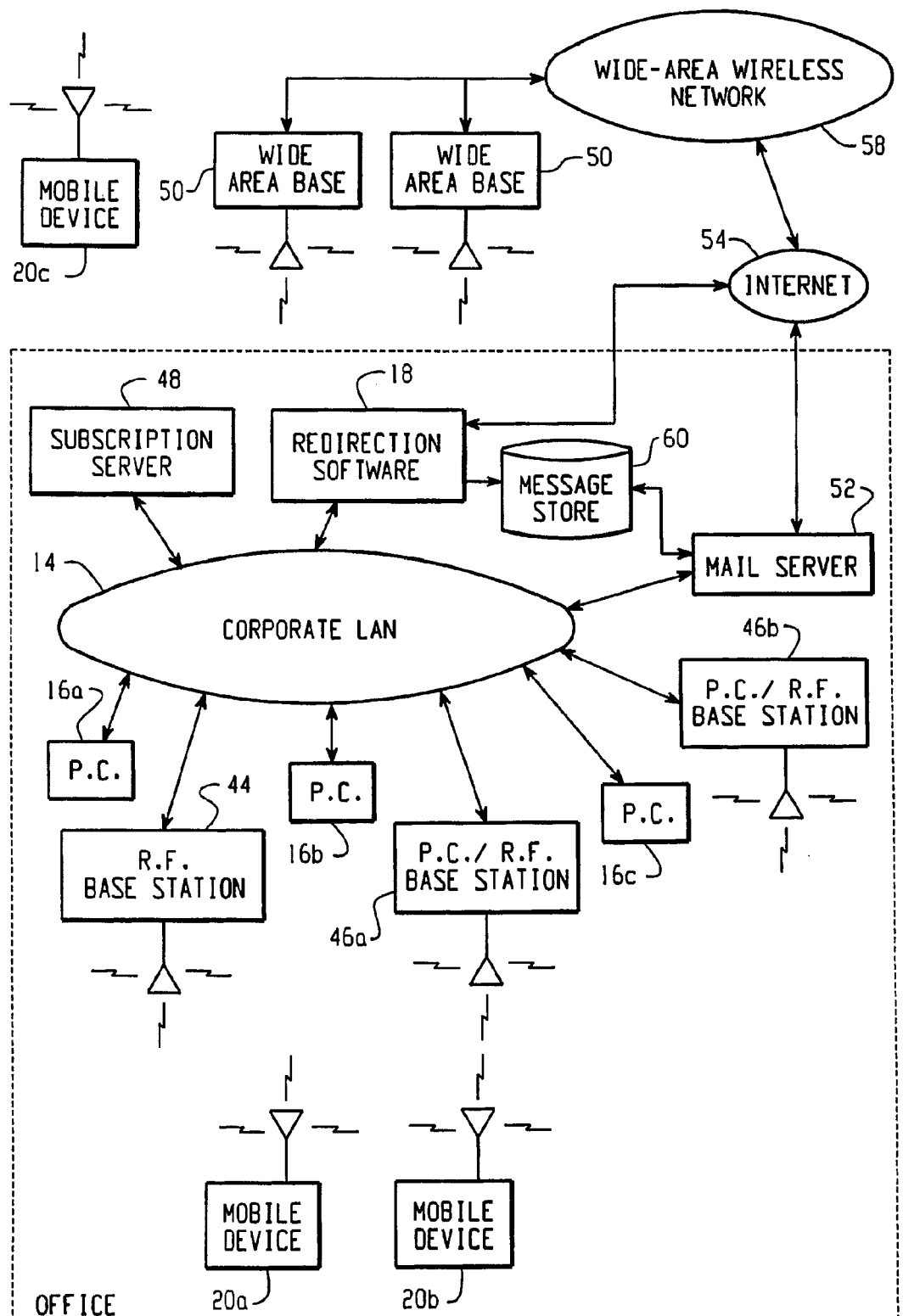
FIG. 3 is a block diagram showing exemplary components of a system for implementing local RF base stations according to an embodiment of the claimed invention.

Referring now to the figures, FIG. 3 is a block diagram showing exemplary components of a system 40 for implementing local RF base stations. The system 40 preferably includes a number of components within an office environment 42, and also utilizes existing infrastructure outside of the office environment 42. Within the office environment 42, the system preferably includes a corporate local-area-network (LAN) 14, a subscription server 48, a plurality of local RF base stations 44, 46a and 46b, and a plurality of mobile devices 20a and 20b. The plurality of local RF base stations 44, 46a and 46b, may include either stand-alone local RF base stations 44 or personal computers configured as local RF base stations 46a and 46b. The system 40 may also include a plurality of personal computers (PCs) 16a, 16b, and 16c, and a redirection software module 18 that operates on the corporate LAN 14 in co-operation with a message store 60 and a mail server 52. The mail server 52 may be any known e-mail solution, such as Exchange®, Lotus Notes®, or the Internet standard IMAP4 solution.

Outside of the office environment 42, the system 40 preferably utilizes a wide-area computer network, such as the Internet 54; a wide-area wireless network 58; and a plurality of wide-area base stations 50. Also shown outside of the office environment 42 is a mobile device 20c.

Operationally, the system 40 can be used to send data communications between mobile devices 20a, 20b or 20c both within and outside the office environment 42. In addition, the system 40 can by used to send data communications to devices (mobile or otherwise) through an e-mail account or other electronic messaging service. Data communications sent between mobile devices 20a, 20b, and 20c without accessing the mail server 52 are referred to herein as "direct." Data communications that are sent or received using the mail server 52 are referred to herein as "e-mail." Within the office environment 42, the plurality of local RF base stations 44, 46a and 46b are coupled to the subscription server 48 over the corporate LAN 14, and each local RF base station preferably has an IP address on the LAN. To exchange information directly between two mobile devices 20a and 20b, a packet of data is prepared, such as an MPAK in the case of a Mobitex network, which can then be transmitted or received from any mobile device 20a or 20b in the office environment 42 by using subscription and routing information stored on the subscription server 48 and also stored in cache memory on the local RF base stations 44, 46a and 46b. The subscription and routing information preferably includes the IP address of the base station that each mobile device has most recently roamed to (or communicated with), and a list of currently valid mobile device identification numbers (such as the MAN in the Mobitex network) and how their usage may affect billing. When an MPAK is received by one of the local RF base stations 44, 46a or 46b, with a particular packet type indicating that it is to be delivered directly to one of the mobile devices 20a or 20b, the routing information stored in the base station's cache memory and on the subscription server 48 enables the MPAK to be routed to the proper local RF base station 44, 46a or 46b where it can then be transmitted to a mobile device 20a or 20b.

It should be understood, however, that the exchange of information to and from a mobile device 20a, 20b or 20c is not limited to the exchange of single MPAKs or other data packets. Rather, data may be transmitted and received by mobile devices 20a, 20b, or 20c in the form of individual data packets, or in the form of larger datagrams composed of multiple data packets. The technique of transmitting and receiving data in the form of data packets or datagrams is commonly known to those skilled in the art of wireless data communications.

If, on the other hand, information is to be exchanged as either an e-mail or directly to a mobile device 20c outside of the office environment 42, then the redirector software 18 is used as a link to the mail server 52 and/or the wide-area network 58. To send or receive e-mail, the redirector software 18 interfaces with the mail server 52 through the message store 60, which is preferably a database. It should be understood, however, that the redirector software 18 may interface with the mail server 52 by any known inter-program communication method, such as an application program interface (API) or a Dynamic Link Library (DLL) interface. The Internet 54 is used by the system 40 both (1) to connect the redirector software 18 to the wide-area wireless network 58 in order to send or receive direct messages to or from mobile devices outside of the office environment 42, and (2) by the mail server 52 to send and receive e-mail. All connections to the Internet 54 are preferably made using standard connection methods such as ISDN, Frame Relay, or T1 links.

Operationally, if one of the mobile devices 20a or 20b transmits an electronic message for delivery to a mobile device 20c located outside of the office environment 42, then the local RF base station 44, 46a or 46b receiving the message (1) recognizes that the mobile device 20c is not in the vicinity of the office environment 42 and (2) sends the electronic message over the corporate LAN 14 to the redirection software 18. The redirection software 18 then sends the message over the Internet 54 to the wide-area wireless network 58, which transmits the message through one of the wide-area base station 50 to the mobile device 20c.

Similarly, if an electronic message is received by the redirection software 18 for delivery to one of the mobile devices 20a or 20b, then the message is sent over the corporate LAN 14 to the mobile device 20a or 20b using the routing information stored both on the subscription server 48 and in the redirection software's 18 cache memory. The routing information enables the system 40 to send the message to the proper local RF base station 44, 46a or 46b for transmission to the mobile device 20a or 20b.

The operation of the redirection software 18 in the context of an e-mail message is described below with reference to FIG. 5.

Figure 4:
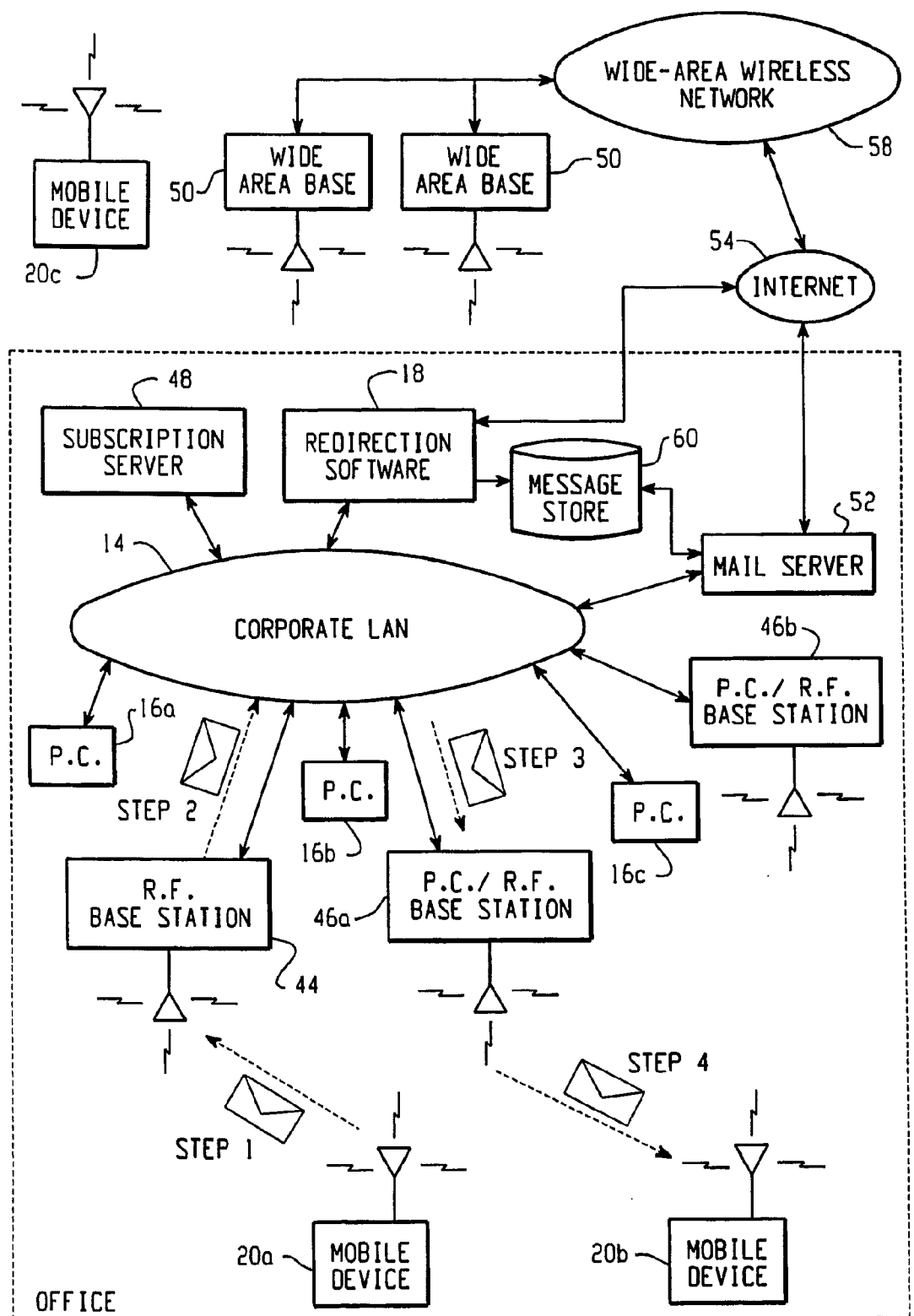
FIG. 4 is a block diagram showing the transmission of an electronic message between two mobile devices using two local RF base stations.

FIG. 4 is a block diagram showing the transmission of a direct electronic message between two mobile devices 20a and 20b using two local RF base stations 44 and 46a. The transmission shown in FIG. 4 takes place on the same system 40 as described above with respect to FIG. 3. Significantly, this system 40 enables two mobile devices 20a and 20b, located within the same office 42, to communicate without accessing the wide-area wireless network 58, thus avoiding the delay often caused by congestion in the network infrastructure, and also avoiding the costs associated with transmitting data over the wide-area wireless network 58.

In step 1, one or more MPAK (or some other type of data packet) is generated by the mobile device 20a and addressed to mobile device 20b. The MPAK (or datagram composed of multiple MPAKs) is then transmitted to the local RF base station 44. Preferably, the packet type indicates that the MPAK is to be delivered directly to the mobile device 20a and is not meant for the redirection software 18, i.e. the message is a direct message. Each local RF base station 44, 46a and 46b preferably includes two system data files: (1) a subscription list and (2) a route cache. The subscription list logs all mobile devices currently active, or last known to be active, on that base station. Therefore, when the direct message is received from the mobile device 20a in step 1, the local RF base station 44 is able to verify that the mobile device 20a has a valid subscription without querying the subscription server 48. By storing this information at each local base station 44, 46a and 46b, congestion on the corporate LAN 14 is reduced, and message delivery time through the system 40 is also reduced.

The routing cache in each local RF base station 44, 46a and 46b may include a log indicating the location of mobile devices to or from which a particular base station has recently received or routed data. Thus, if a local RF base station has in its routing cache the IP address for the local RF base station last known to be covering a destination mobile device, then a message may be sent directly to the proper local RF base station over the corporate LAN without first accessing the subscription server 48. For instance, with reference to FIG. 4, if data has recently been routed between the local RF base station 44 and the mobile device 20b through the local base station 46a, then the local RF base station 44 will know from its routing cache that the mobile device 20b is most likely still covered by the local RF base station 46a. Then, in steps 2 and 3 the direct message addressed to the mobile device 20b is routed to the local RF base station 46a over the LAN 14. If the IP address for the base station covering the mobile device 20b is not in its routing cache, however, then the local RF base station 44 obtains this data from the subscription server 48.

Upon receiving the direct message from the LAN 14, the local RF base station 46a preferably accesses its subscription list to ensure that the mobile device 20b has not roamed to another base station. If the mobile device 20b is no longer covered by the local RF base station 46, then the local base station 44 accesses the subscription server 48 to determine the new location of the mobile device 20b, and re-routes the message. Once the local RF base stations 44 and 46a have confirmed that the direct message has been correctly routed, the message is transmitted to the mobile device 20b in step 4.

Figure 5:
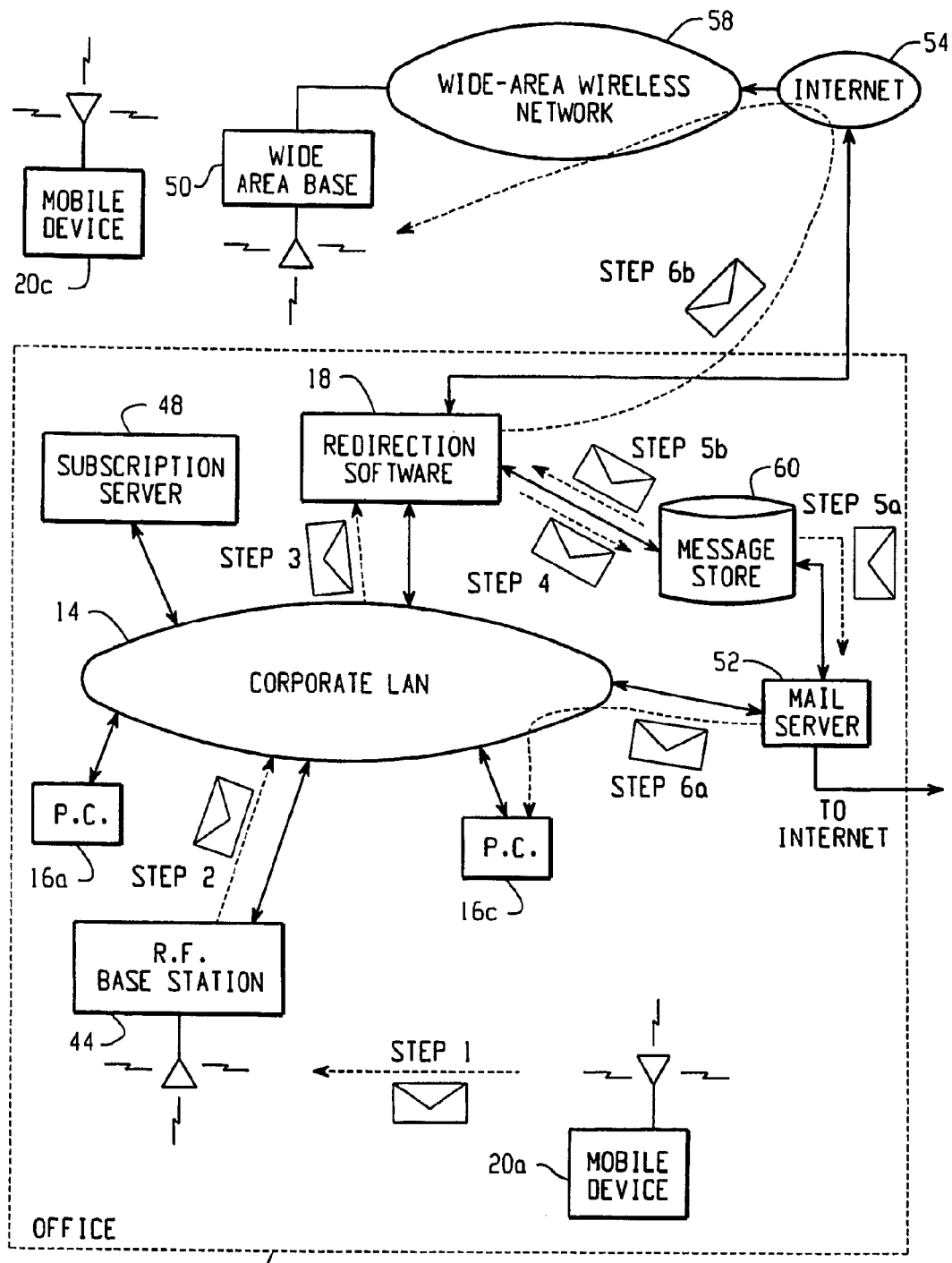
FIG. 5 is a block diagram showing the redirection of an e-mail message transmitted from a mobile device within the office environment to both a mobile device outside of the office environment and an electronic mailbox.

FIG. 5 is a block diagram showing the redirection of an e-mail message transmitted from a mobile device 20a within the office environment 42 to a mobile device 20c located outside of the office environment 42. The system shown in FIG. 5 is the same system 40 as described above with respect to FIGS. 3 and 4. In this instance, however, the block diagram demonstrates the use of the redirection software module 18 to receive an e-mail message addressed to a user's electronic mailbox, and then forward the e-mail to the user's mobile device 20c. The redirection software module 18 may be any known version of redirection software operating on a corporate LAN, such as that described in U.S. Pat. No. 6,219,694.

In step 1, a wireless e-mail MPAK addressed to an electronic mailbox is transmitted by the mobile device 20a and received by the local RF base station 44. Preferably, the local RF base station 44 can identify that the message is an e-mail based on the type of data packet in which it is transmitted. In steps 2 and 3 the e-mail MPAK message is sent to the corporate LAN 14 and is detected by the redirection software module 18. Once all of the e-mail MPAKs comprising the message are received by the redirection software module 18, the e-mail is re-assembled from the data packets, and then transferred to the message store 60 in step 4. From the message store 60, the e-mail message is detected by the mail server 52, and a copy is routed into the electronic mailbox (step 5a). In an alternative embodiment, the e-mail message may be transferred directly from the redirection software module 18 to the mail server 52.

In this instance, the owner of the electronic mailbox has instructed the redirection software module 18 to redirect a copy of his or her e-mail messages to the mobile device 20c. Therefore, when the e-mail message is placed into the electronic mailbox, the redirection software 18 pulls a copy of the electronic message out of the message store 60 and prepares it for wireless transmission (step 5b).

The redirection software 18 then accesses a routing cache located in the redirection software module's cache memory, and, if necessary, the subscription server 48, to determine the IP address of the local RF base station 46a or 46b that has last been in contact with the mobile device 20c. If the destination mobile device is local within the office environment 42, then the message is routed to a local RF base station 44, 46a or 46b for transmission to the mobile device 20. In this example, however, the mobile device 20c is outside of the office environment, and is, therefore, only accessible through the wide-area network 58. Therefore, in step 6b the message is delivered via the Internet 54 to the wide-area wireless network 58. At the user's option, the e-mail message may also be delivered to the user's desktop computer system 16c (step 6a).

Similarly, e-mail MPAKs sent over the Internet from outside the office environment may be received by the redirection software module 18 and reassembled into an e-mail message. The e-mail is then transferred to the message store 60, from which it may be transferred to an electronic mailbox by the message server 52 and/or to a mobile devices by the redirection software 18.

Figure 6:
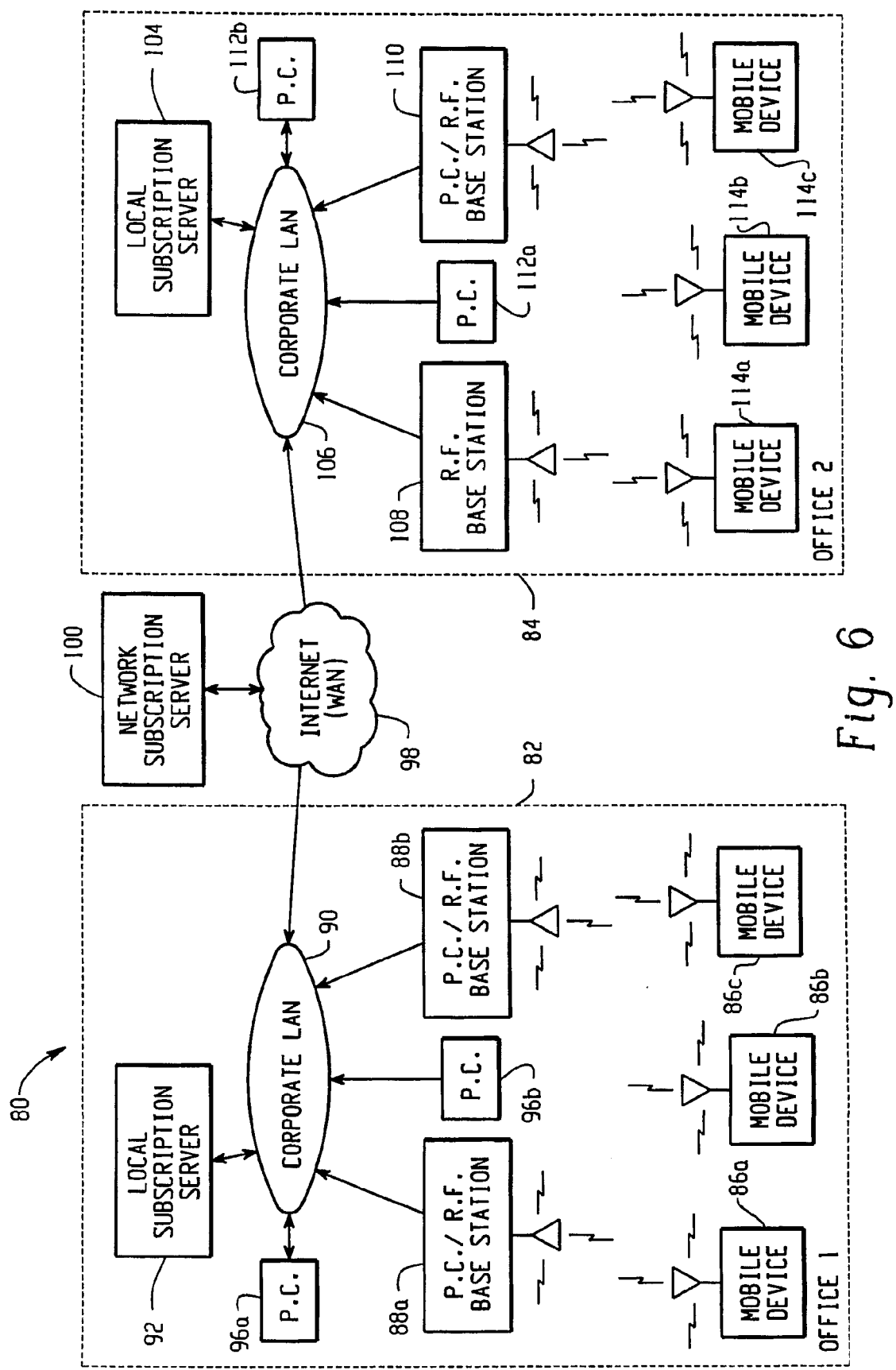
FIG. 6 is a block diagram showing exemplary components of a WAN-based system for implementing local RF base stations according to one embodiment of the claimed invention.

FIG. 6 is a block diagram showing exemplary components of a WAN based system 80 for implementing local RF base stations 88a, 88b, 108 and 110 according to one embodiment of the present invention. In this WAN-based system 80, a plurality of local systems 82 and 84 are interconnected over the Internet 98 (or some other form of wide-area computer network) to allow wireless communication between remote locations without the use of the wireless network infrastructure. It should be understood, however, that although FIG. 6 shows only two local systems 82 and 84, the WAN-based system 80 preferably includes any number of local systems each connected to one another via the WAN 98, or some combination of networks.

The WAN-based system 80 operates essentially like the local system 40 described above with respect to FIGS. 3-5; the only substantial difference being the use of the Internet 98 to connect the local systems 82 and 84, and the addition of a network subscription server 100. The IP addresses used to identify the local RF base stations 88a, 88b, 108 and 110 on the corporate LANs 90 and 106 are equally applicable to locate the base stations on a WAN such as the Internet 98. Because a TCP/IP protocol does not make allowances for mobile devices roaming quickly and randomly through a large WAN, however, the network subscription server 100 is needed to keep track of which LAN is in communication with, or has most recently been in communication with, any given mobile device 86a, 86b, 86c, 114a, 114b or 114c. For example, if mobile device 86a had just roamed from a different location and become active on local RF base station 88a, the base station 88a would preferably update the local subscription server 92, which would then update the network subscription server 100. Thereafter, if a message was sent to mobile device 86a from outside its local network 82, the network subscription server 100 would route the message to the proper corporate LAN 90, and the local subscription server 92 would then route the message to the proper local RF base station 88a.

Figure 7:
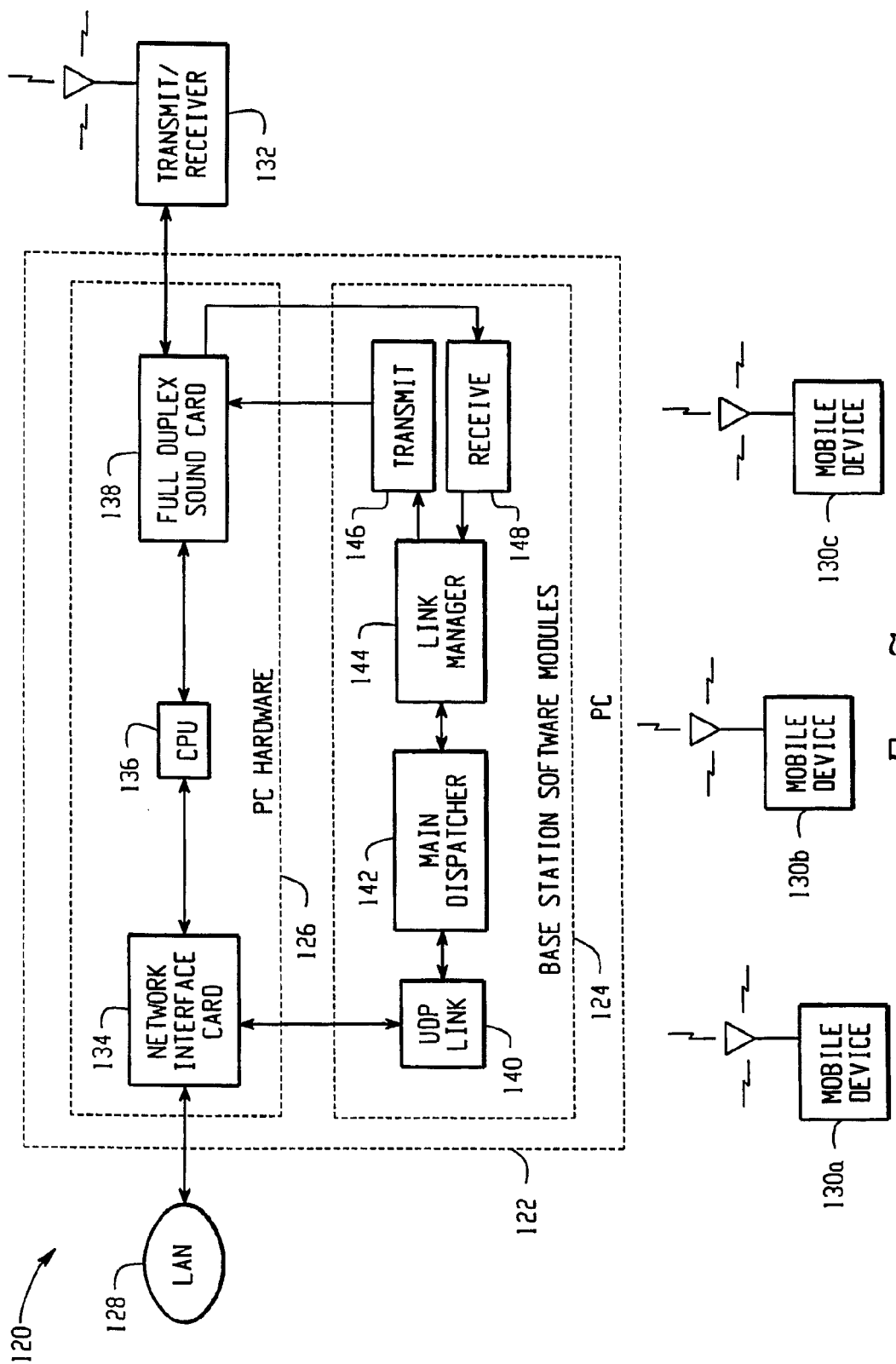
FIG. 7 is a block diagram showing exemplary hardware and software components of a local RF base station.

FIG. 7 is a block diagram showing exemplary hardware 126 and software 124 components of a local RF base station 120. The local RF base station 120 is preferably constructed using a general-purpose PC 122 or networked computer and commercially available, off-the-shelf components. It should be understood, however, that a custom, stand-alone local RF base station may be specially constructed for use in a local RF base station system, such as the system 40 described herein.

The PC hardware 126 includes a network interface card 134, a central processing unit (CPU) 136, and a full duplex sound card 138. Configured to the full duplex sound card is a transmitter/receiver 132. The PC is programmed with base station software modules 124, such as a UDP Link module 140, a Main Dispatcher module 142, a Link Manager module 144, a Transmit module 146, and a Receive module 148. These modules may be implemented using any suitable software programming language.

The transmitter/receiver 132 is preferably external to the PC 122 (although it could be internally located) and sends and receives modulated radio frequency (RF) signals to and from a plurality of mobile devices 130a, 130b, and 130c in proximity to the local RF base station 120. Preferably, the modulated signals are encoded ROSI frames that include packets of data in the form of an MPAK, although other framing formats and packet types could be utilized. The transmitter/receiver 132 can be any device or combination of devices commonly used by those skilled in the art to transmit and receive RF signals.

The transmitter/receiver 132 is coupled to the full duplex sound card 138, which is operable within the PC 122. A commercially available full duplex sound card 138 is capable of providing sufficient analog input/output to produce a baseband modulated stream for transmission, and to demodulate an incoming base-band signal. One full duplex sound card 138 found to be capable of performing such a function is the SoundBlaster.TM. PCI128 sound card. It should be understood, however, that the full duplex sound card 138 may be substituted with any type of sound card or other device capable of (1) demodulating a base-band signal, and (2) producing a base-band modulated stream for transmission by the transmitter/receiver 132.

The base station software modules 124, described in more detail below with respect to FIG. 8, convert the MPAKs into UDP/IP packets that can be transferred between local RF base stations over the corporate LAN 128. The UDP/IP packets are transmitted and received to and from the LAN 128 by the network interface card 134.

All of the PC hardware devices 126, including the full duplex sound card 138 and the network interface card 134, are coupled by the CPU 136, which performs the dual functions of synchronizing the PC hardware 126 and executing the base station software modules 124.

Figure 8:
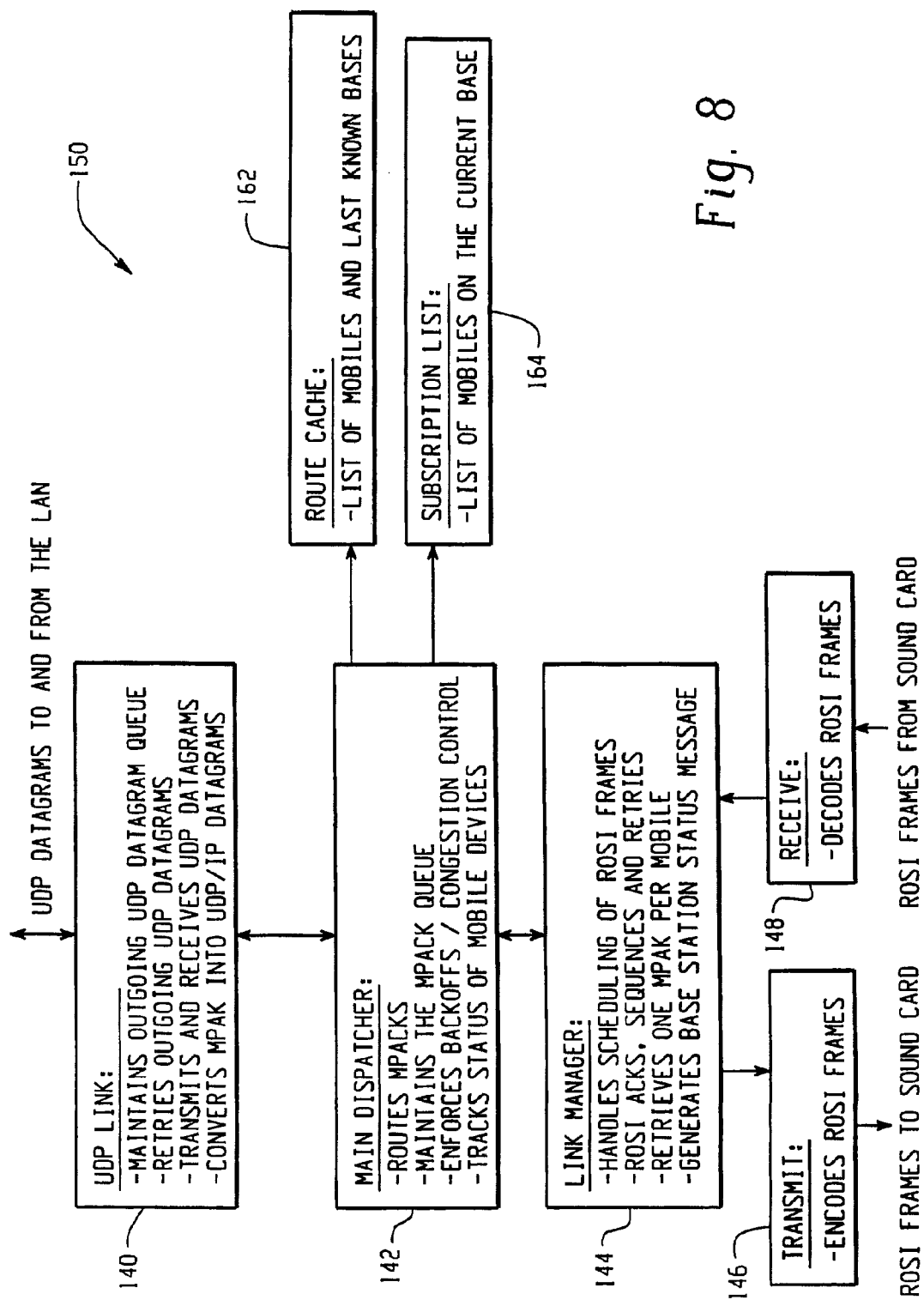
FIG. 8 is a block diagram showing exemplary functions performed by the base station software modules.

FIG. 8 is a block diagram showing exemplary functions performed by the base station software modules 124. The base station software modules 124 preferably include a UDP Link module 140, a Main Dispatcher module 142, a Link Manager module 144, a Transmit module 146, and a Receive module 148. In addition, a route cache 162 and a subscription list 164 are preferably included as data files in memory on each local RF base station.

Operationally, these software modules preferably operate as follows. When a modulated signal is received from a mobile device 130a, 130b or 130c, the signal is converted to a ROSI frame by the full duplex sound card 138 and the Receive module 148. The ROSI frame is then decoded by the Receive module 148 to extract a data packet, such as an MPAK. The MPAK is retrieved by the Link Manager module 144, which schedules the receipt and transmission of ROSI frames to and from the full duplex sound card 138. As part of its function, the Link Manager module 144 may also coordinate sequences of ROSI frames to be transmitted to one or more mobile device, or repeatedly retry the transmission of a ROSI frame to a mobile device that has lost coverage until an "ACK" message is received. In addition, the Link Manager module 144 may also generate system messages for the mobile devices, such as a message paging a mobile device or indicating when traffic may be delivered.

From the Link Manager module 144 an MPAK is passed to the Main Dispatcher module 142, which maintains a queue of MPAKs for routing to other local RF base stations. The routing functions of the Main Dispatcher module 142 are discussed in more detail below with reference to FIGS. 9-12. Briefly stated, the Main Dispatcher module 142 tracks the status and location of mobile devices in the system by utilizing the route cache 162 and the subscription list 164 on the local RF base station 120, along with the subscription server 48 on the corporate LAN 128. In addition, the Main Dispatcher module 142 coordinates the receipt and delivery of MPAKs to and from other base stations over the corporate LAN 128, allotting for system congestion on the LAN 128 or mobile traffic congestion at the local RF base station 120.

Once an MPAK has been routed by the Main Dispatcher module 142, the UDP Link module 140 encapsulates the MPAK into a UDP/IP datagram. The UDP/IP datagram includes both the MPAK and the IP address of the local RF base station to which the MPAK is to be delivered. This is possible because the maximum size of an MPAK is smaller than that of a UDP/IP datagram. Because a UDP/IP packet does not provide guaranteed delivery, however, it is necessary for the receiving base station to return a message indicating that the datagram has been received. After the MPAK has been converted into a UDP/IP datagram, the UDP Link module 140 transfers the datagram into an outgoing UDP datagram queue and then transmits it over the LAN 128 using the network interface card 134.

Similarly, when a UDP datagram is received from another local RF base station by the network interface card 134, the datagram is converted to an MPAK by the UDP Link module 140. The Main Dispatcher module 142 then locates the destination mobile device and transfers the MPAK to the Link Manager module 144. The Link Manager module 144 pages the destination mobile device and transfers the ROSI frame to the Transmit module 146 where it is encoded. The ROSI frame is then converted into a modulated waveform and transmitted to the destination mobile device.

One aspect of the present invention is the ability to tunnel Mobitex MPAKs through an IP network, routing them from one local RF base station to another using an IP address contained in a UDP/IP datagram. Mobile devices, however, are addressed and identified by a mobile identification number, such as the MAN (Mobitex Access Number) in the Mobitex network. Therefore, a local RF base station system, such as shown and described herein, should be able to, at any time, query (1) which local RF base station a MAN is currently attached to, and (2) what that base station's IP address is.

As discussed above with respect to FIGS. 4 and 8, each local RF base station preferably maintains a route cache that relates the MAN of frequently contacted mobile devices with the IP address of the local RF base station most recently covering each such mobile device. In addition, each local RF base station also maintains a subscription list that identifies the MAN of the mobile devices it is presently covering. By utilizing its subscription list and route cache, a local RF base station may deliver a message without first having to access the subscription server 48 which logs the subscription information and location of all of the mobile devices having access to the system 40. FIGS. 9-12 show exemplary methods by which the local RF base stations may utilize local subscription lists and routing caches, while enabling the mobile devices to freely roam from one local RF base station to another.

Figure 9:
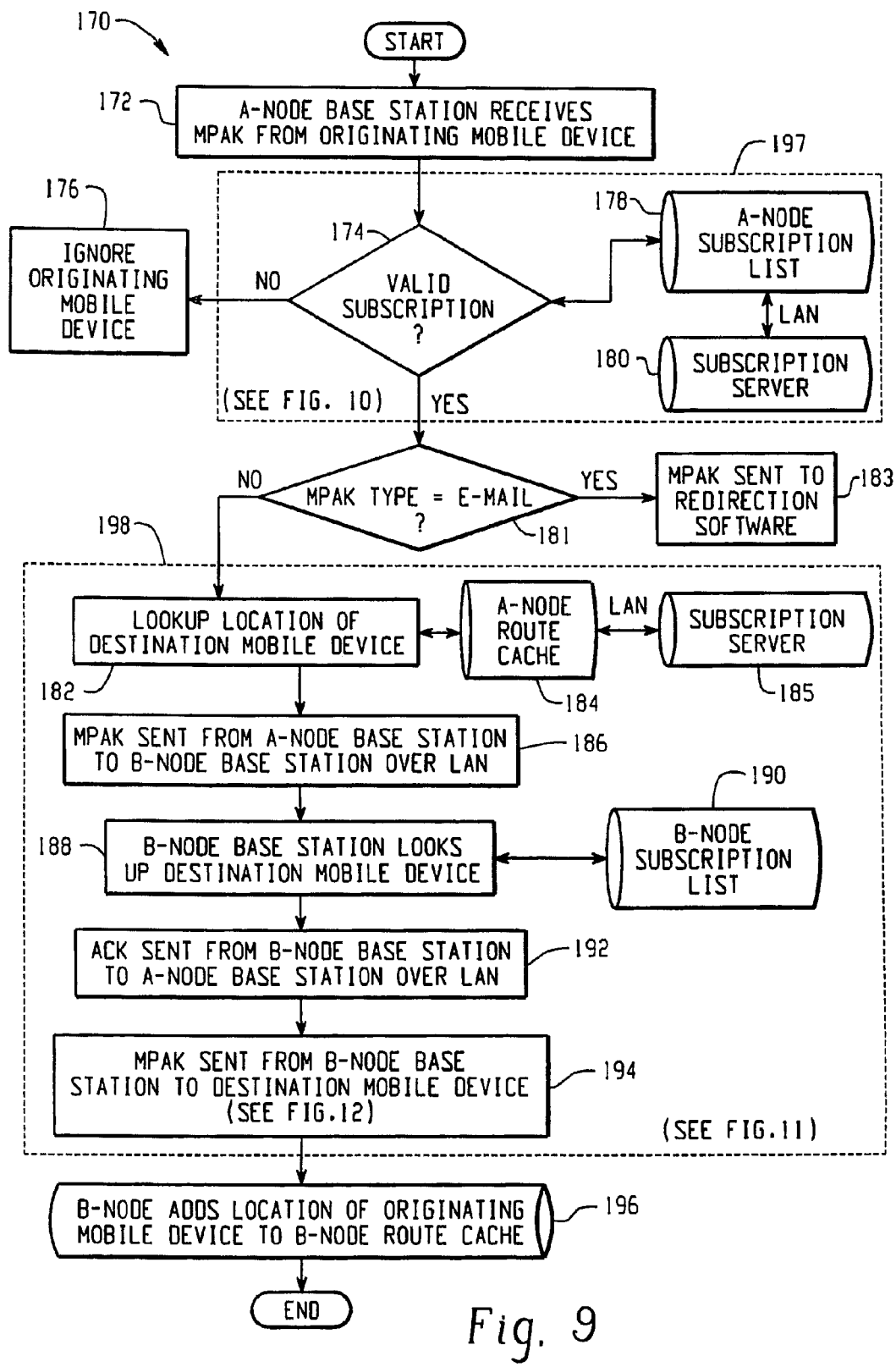
FIG. 9 is a flow diagram showing an exemplary method for sending an electronic message from an originating mobile device to a destination mobile device using a local RF base station system.

FIG. 9 is a flow diagram showing an exemplary method 170 for sending an electronic message from an originating mobile device to a destination mobile device using a local RF base station system. Some steps within the flow diagram shown in FIG. 9 are surrounded by dashed boxes 197 and 198. The functions performed by these steps are set forth in greater detail in FIGS. 11 and 12, respectively.

In step 172, a local RF base station, designated as the A-Node Base Station, receives a packet of data, such as an MPAK, from an originating mobile device. Once the MPAK is received, the A-Node Base Station accesses its subscription list (steps 174 and 178), and possibly the subscription server (step 180), to determine whether the originating mobile device has a valid subscription. If the originating mobile device is new to the A-Node Base Station, then the subscription server is also accessed to obtain the subscription information and update the A-Node subscription list (step 180). Once the subscription information for the origination mobile device has been obtained, the A-Node Base Station either ignores the origination mobile device (step 176), or, if the subscription is valid, determines the location of the destination mobile device (step 182).

In step 181, it is determined whether the MPAK contains data for a direct message or an e-mail message. If the MPAK contains data for an e-mail message, then the MPAK is sent over the LAN to the redirection software module 18. The redirection software module 18 then sends an "ACK" signal to the A-Node to confirm receipt of the e-mail MPAK, and processes the e-mail as described above with respect to FIG. 5.

If, on the other hand, the MPAK contains data for a direct message, then in step 182 the A-Node Base Station locates the IP address of the local RF base station last in contact with the destination mobile device (B-Node Base Station) by accessing the A-Node route cache (step 184), and, if necessary, the subscription server (step 185). The MPAK is then sent over the corporate LAN to the B-Node Base Station in step 186. Once the B-Node Base Station has received the MPAK, it accesses its subscription list to ensure that the destination device has not roamed to another base station (steps 188 and 190). If the destination mobile device is found in the B-Node subscription list, then the B-Node Base Station sends a confirming "ACK" signal to the A-Node Base station, and transmits the MPAK to the destination mobile device (steps 192 and 194). In step 196, the B-Node Base Station completes the process by adding the location of the originating mobile device to the B-Node route cache so that a return message may be sent without having to first access the subscription server.

Figure 10:
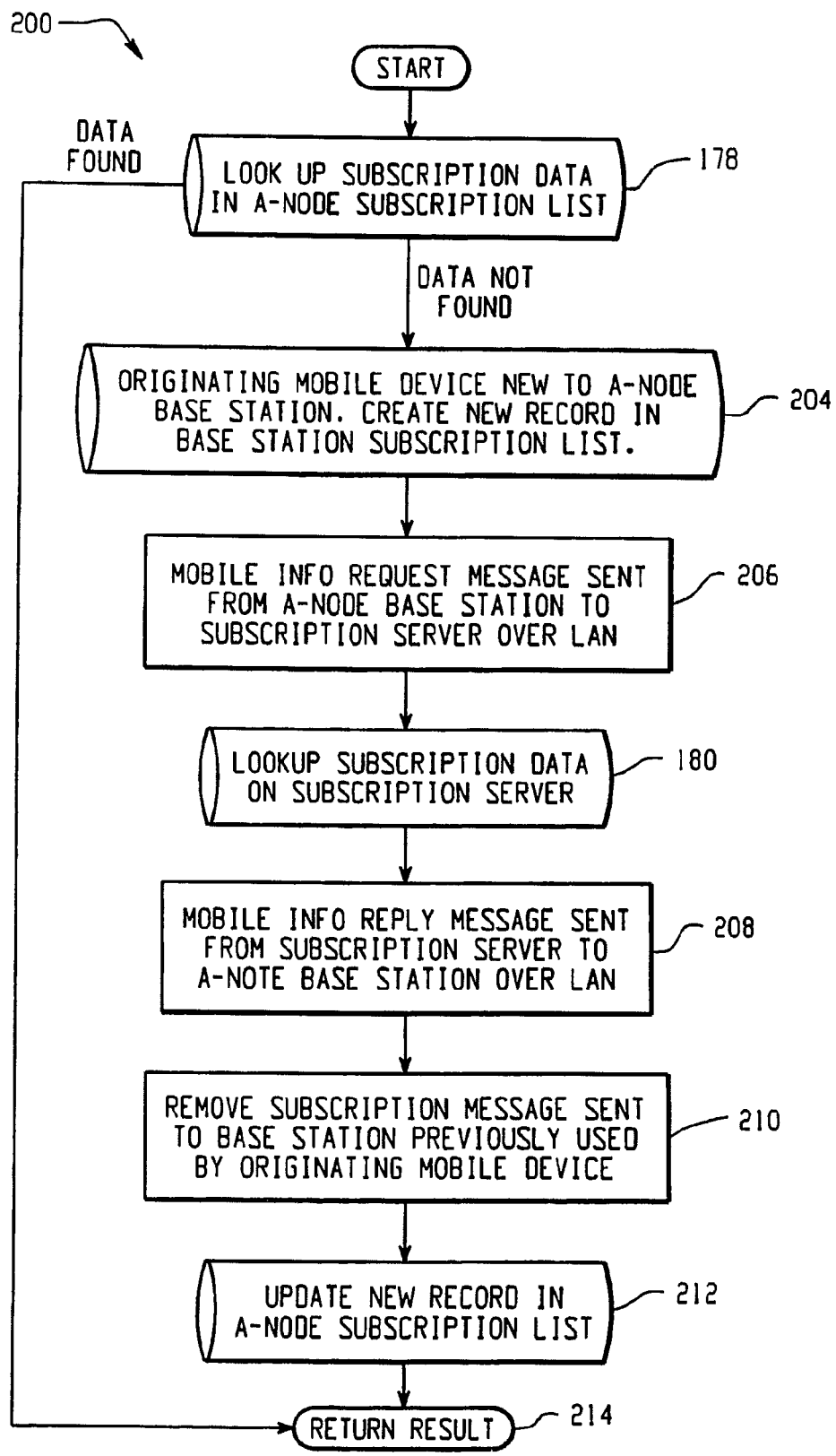
FIG. 10 is a flow diagram showing an exemplary method for updating a subscription list in a local RF base station.

FIG. 10 is a flow diagram showing an exemplary method 200 for updating a subscription list in a local RF base station. This exemplary method 200 is a more detailed version of the steps shown within the dashed block 197 in FIG. 9. In step 178, the A-Node Base Station accesses its subscription list to ensure that the originating mobile device has a valid subscription. If subscription data for the originating mobile device is found in the A-Node subscription list, no further steps are necessary and a result is returned in step 214. If the originating mobile device has roamed from another base station, however, then the originating mobile device is considered new to the A-Node Base Station, and will not be in the A-Node subscription list. In such a case, a new record is created in the A-Node subscription list (step 204), and a "mobile info request" message is sent over the LAN from the A-Node Base Station to the subscription server (step 206).

When the subscription server receives the "mobile info request" message, it looks up the requested subscription information from a database (step 180), and returns the subscription information along with a "mobile info reply" message over the LAN to the A-Node Base Station (step 208). In addition, the subscription server sends a "remove subscription" message to the local RF base station previously used by the originating mobile device before it roamed to the A-Node Base Station (step 210). Upon receiving the "remove subscription" message, the previous base station purges its subscription list by removing all of the subscription data for the originating mobile device. Then, in step 212, the A-Node Base Station updates its subscription list with the data retrieved from the subscription server, and returns a result in step 214.

Figure 11A:
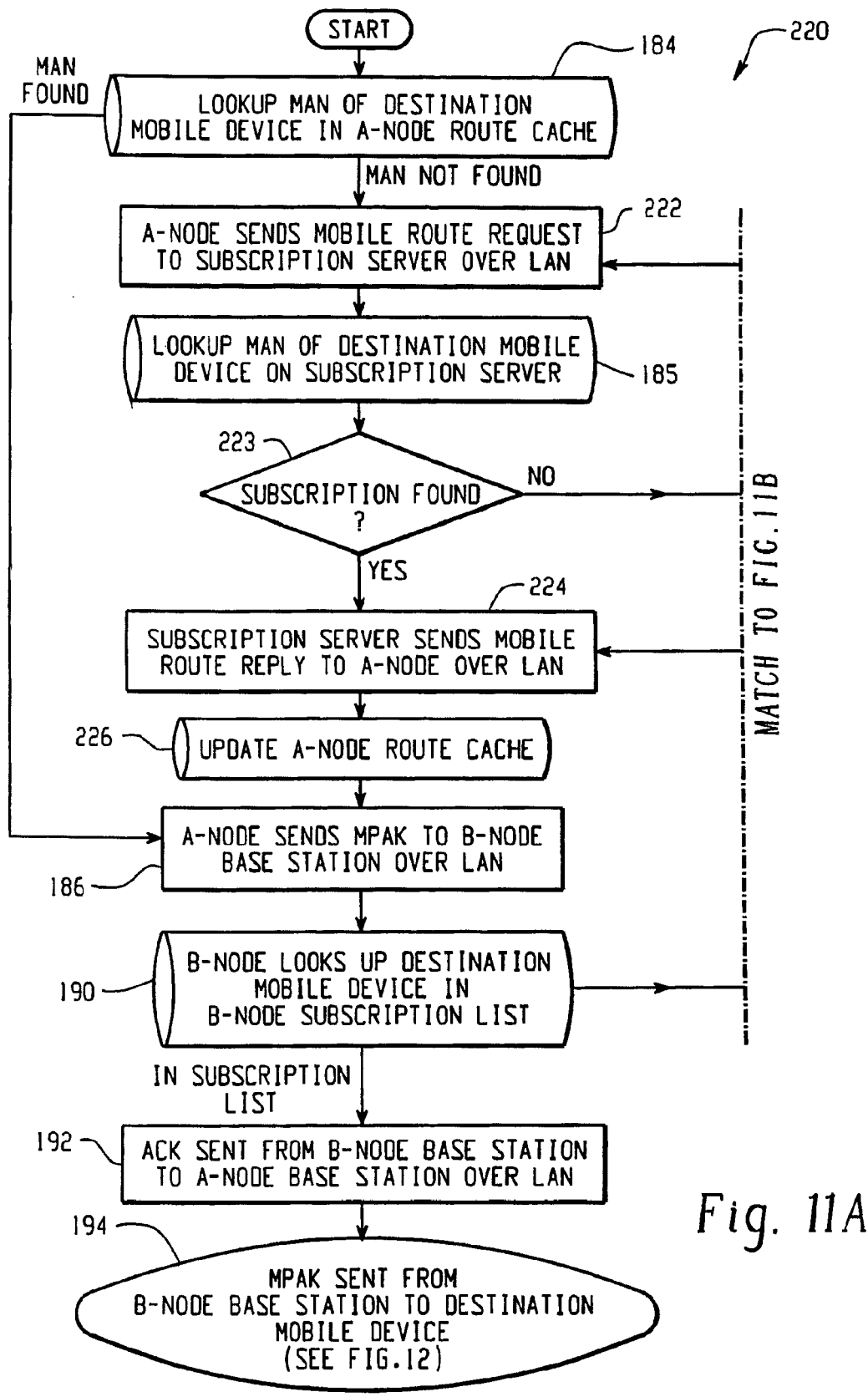
FIG. 11 is a flow diagram showing an exemplary method for determining the location of a mobile device in a local RF base station system.
Figure 11B:
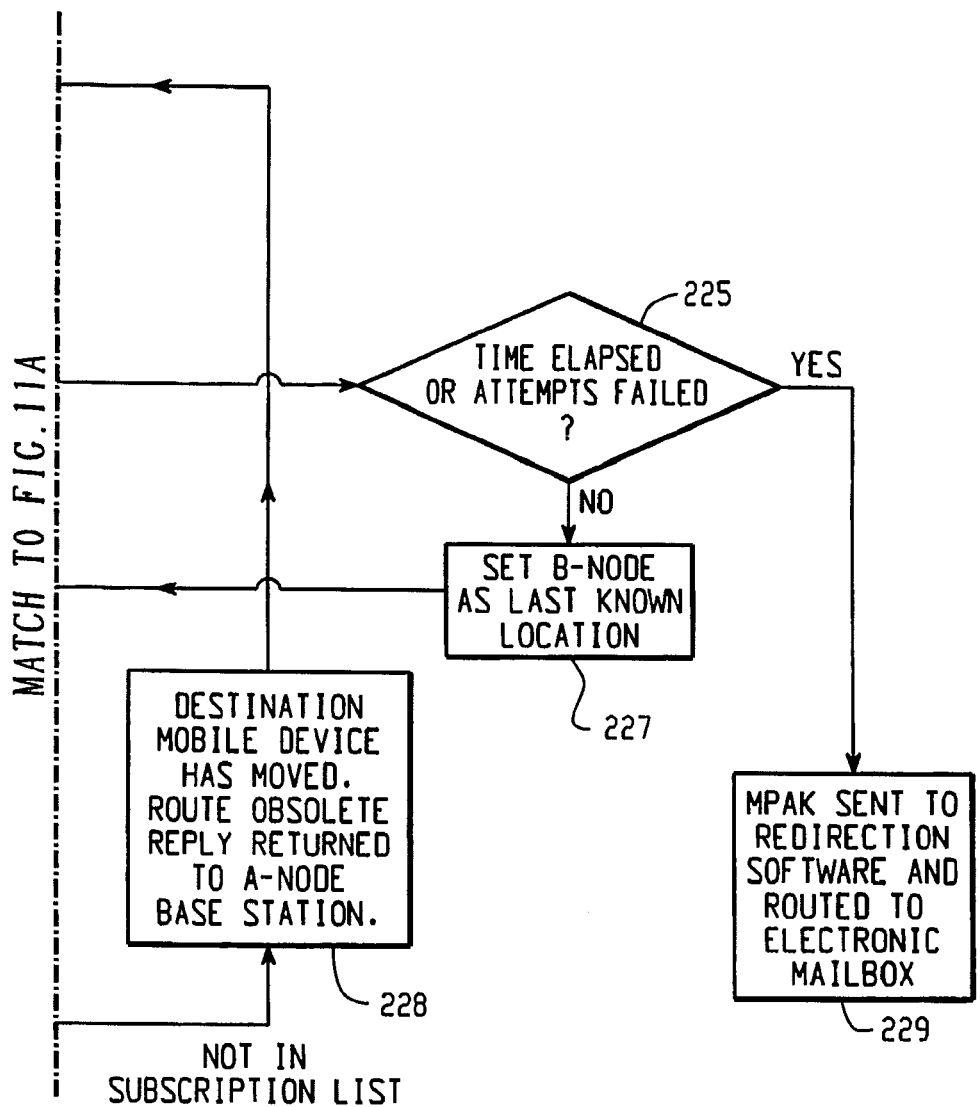

FIG. 11 is a flow diagram showing an exemplary method 220 for determining the location of a mobile device in a local RF base station system. The exemplary method 220 is a more detailed version of the steps shown in the dashed box 198 in FIG. 9. In step 184, the A-Node Base Station, having received an MPAK addressed to the destination mobile device, accesses its route cache to determine the IP address of the local RF base station last in contact with the destination mobile device. If routing information corresponding to the MAN (or any other type of mobile identification number) of the destination mobile device is found in the A-Node route cache, then the MPAK is sent to the B-Node Base Station over the LAN in step 186. If the A-Node route cache does not contain routing information for the destination mobile device, however, then the A-Node Base Station must first retrieve the routing information from the subscription server in steps 185 and 224, and update its route cache in step 226.

In the event that the subscription server 48 does not include the location of the destination mobile device (step 223), then the subscription server preferably calculates (1) the time elapsed since the destination mobile device has last been contacted and (2) the number of failed attempts to locate destination mobile device (step 225). If a pre-set time interval has elapsed since the destination mobile device has last been successfully contacted, or if a pre-set number of failed attempts to contact the destination mobile device has been exceeded, then the MPAK will preferably be delivered to the redirection software module 18 to be routed to an electronic mailbox associated with the destination mobile device. Otherwise, the subscription server 48 sets the B-Node base station as the last local RF base station in contact with the destination mobile device (step 227).

Once the B-Node Base Station has received the MPAK over the LAN, it accesses its subscription list in step 190 to determine whether the destination mobile device is currently within the coverage area of the B-Node Base Station. If the destination mobile device has roamed to another base station, then it will not be listed in the B-Node subscription list, and a "route obsolete" message is sent to the A-Node Base Station in step 228. If the destination mobile device is still within the coverage area of the B-Node Base Station, however, then an "ACK" message is sent to the A-Node Base Station in step 192, and the MPAK is transmitted to the destination mobile device in step 194.

Figure 12:
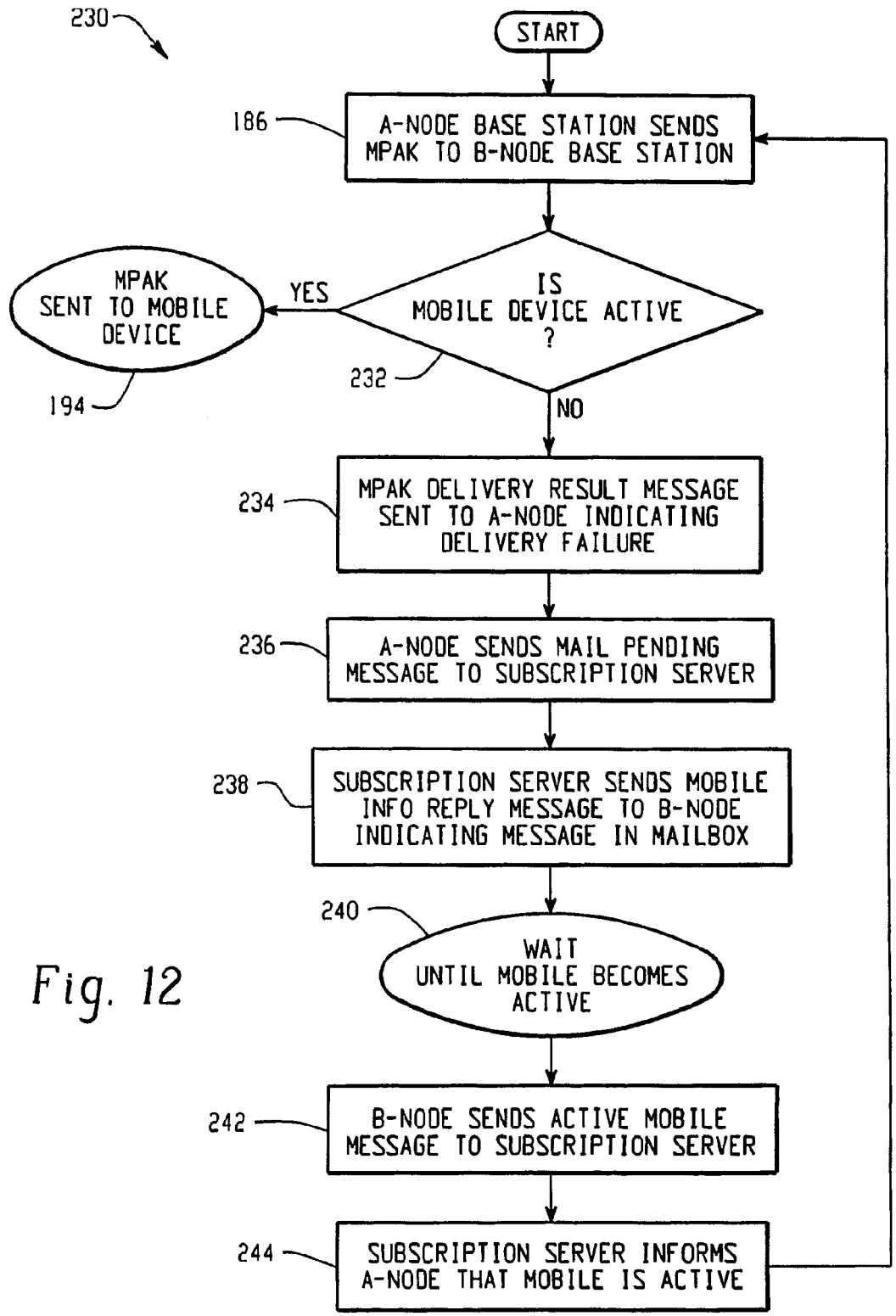
FIG. 12 is a flow diagram showing an exemplary method for transmitting an MPAK to the destination mobile device.

FIG. 12 is a flow diagram showing an exemplary method 230 for transmitting an MPAK to the destination mobile device. After receiving the MPAK over the LAN in step 186, the B-Node Base Station attempts to transmit the MPAK to the destination mobile device in step 232. If the transmission is unsuccessful after several attempts, and the destination mobile device should be within the coverage of the B-Node Base Station, then the destination mobile device is designated as inactive in step 232. The B-Node Base Station then sends an "MPAK delivery result" message to the A-Node Base Station indicating that the transmission has failed (step 234). Upon receiving notification of the transmission error, the A-Node Base Station sends a "mail pending" message to the subscription server (step 236), and the subscription server sends a "mobile info reply" message to the B-Node Base Station which indicates that the destination mobile device has a message waiting in its electronic mailbox (step 238). When the destination mobile device finally regains coverage (step 240), the B-Node Base Station sends a "mobile active" message to the subscription server (step 242). The subscription server then notifies the A-Node Base Station that the destination mobile device has become active (step 244), and the MPAK is resent over the LAN (step 186).

Figure 13A:
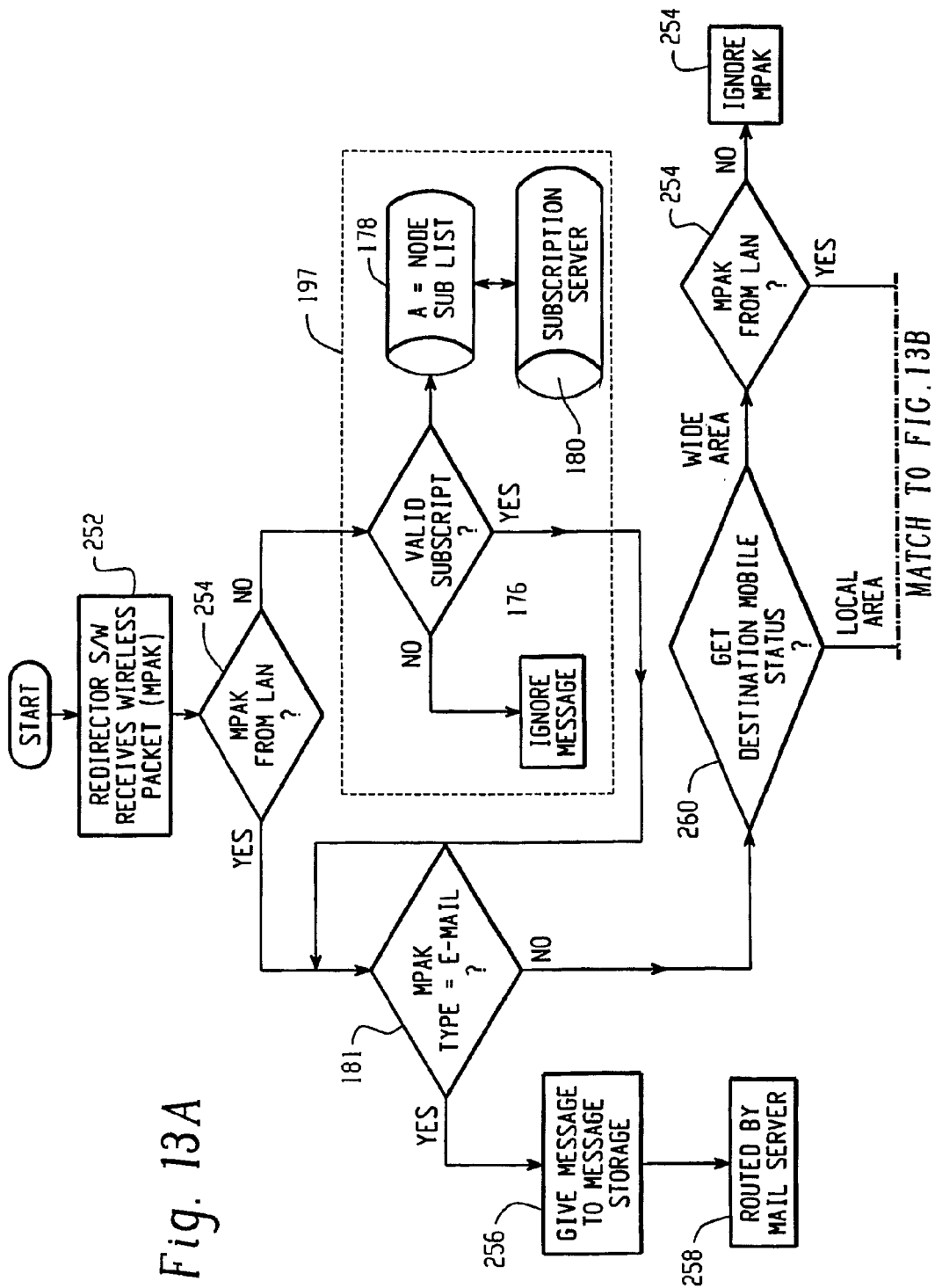
FIG. 13 is a flow diagram showing an exemplary method for processing a received MPAK at the redirection software module.
Figure 13B:
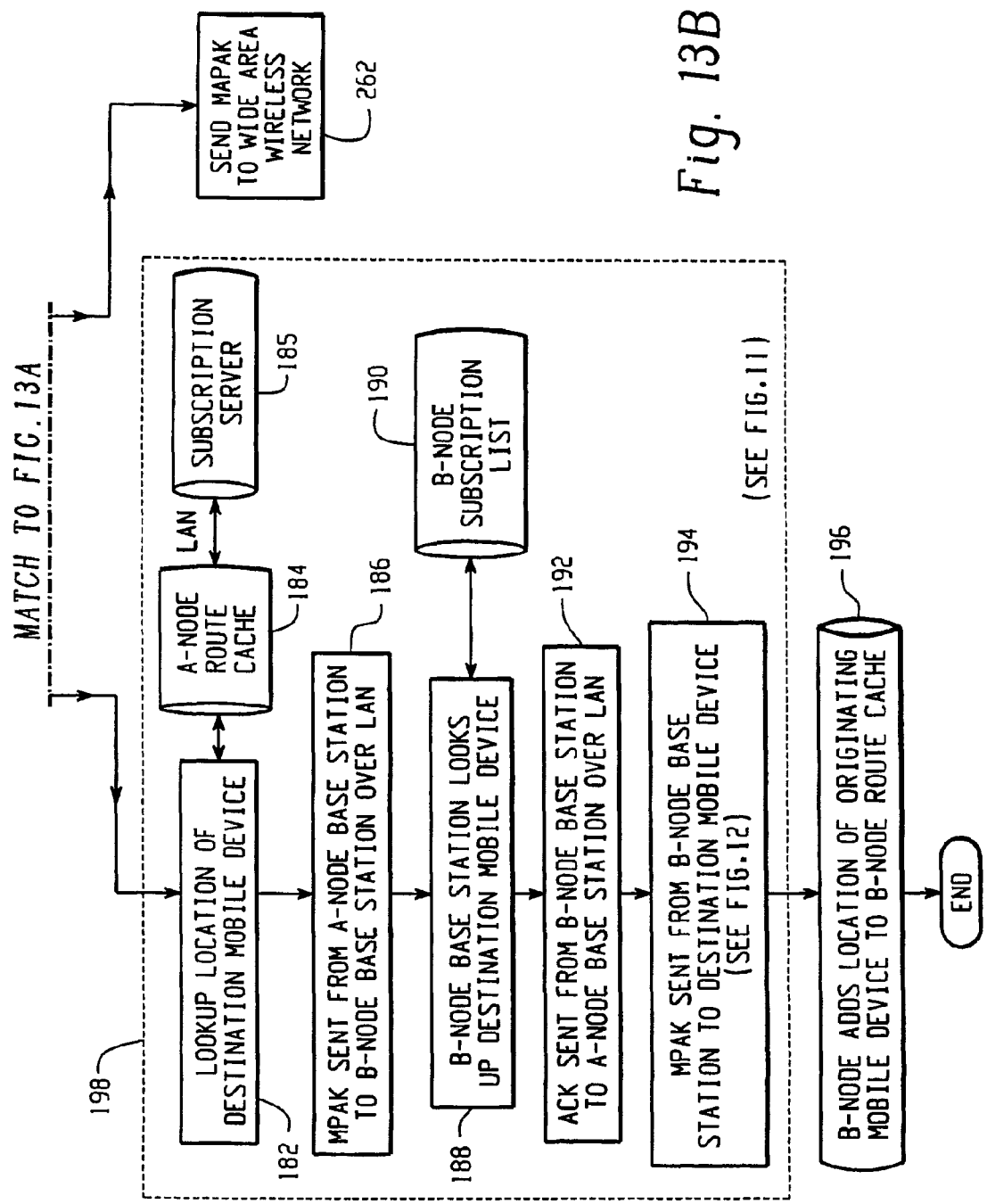

FIG. 13 is a flow diagram showing an exemplary method 250 for processing a received MPAK at the redirection software module 18. In step 252, an MPAK is received by the redirection software module 18. Once the MPAK is received, the redirector software module 18 then determines whether the MPAK was sent from one of the local base stations 44, 46*a* or 46*b* over the LAN, or from the wide-area wireless network 58 (step 254). If the MPAK was received over the LAN, then the amount of processing may be reduced since the local RF base station has already verified the subscription of the originating mobile device. If, however, the MPAK was received from the wide-area network, then the subscription must be verified as described above with respect to FIG. 9.

In step 181, the redirection software module 18 determines whether the MPAK is part of an e-mail message or a direct message. If it is an e-mail MPAK, then the message is re-assembled by the redirection software module 18, and transferred to the message store 60 (step 256). From the message store 60, the e-mail is routed to the appropriate electronic mailbox by the mail server 52 (step 258). If, on the other hand, the MPAK is part of a direct message, then the redirection software module 18 determines whether the destination mobile device is located within the office environment 42 (step 260).

If the MPAK is to be delivered to a mobile device within the office environment 42, then the MPAK is routed and transmitted as described above with respect to FIGS. 9 and 11. If, however, the MPAK is addressed to a mobile device located outside the office environment 42, then the redirection software module 18 verifies that the MPAK has been sent from the LAN 14 (step 260). Step 260 is performed to prevent the local IP base station system from routing an MPAK from the wide-area wireless network 58 back to the wide-area wireless network 58. Therefore, if the MPAK did not originate from the LAN it is ignored (step 254). Otherwise, the MPAK is transmitted over the wide-area wireless network 58 via the Internet 54 in step 262.

Figure 14:
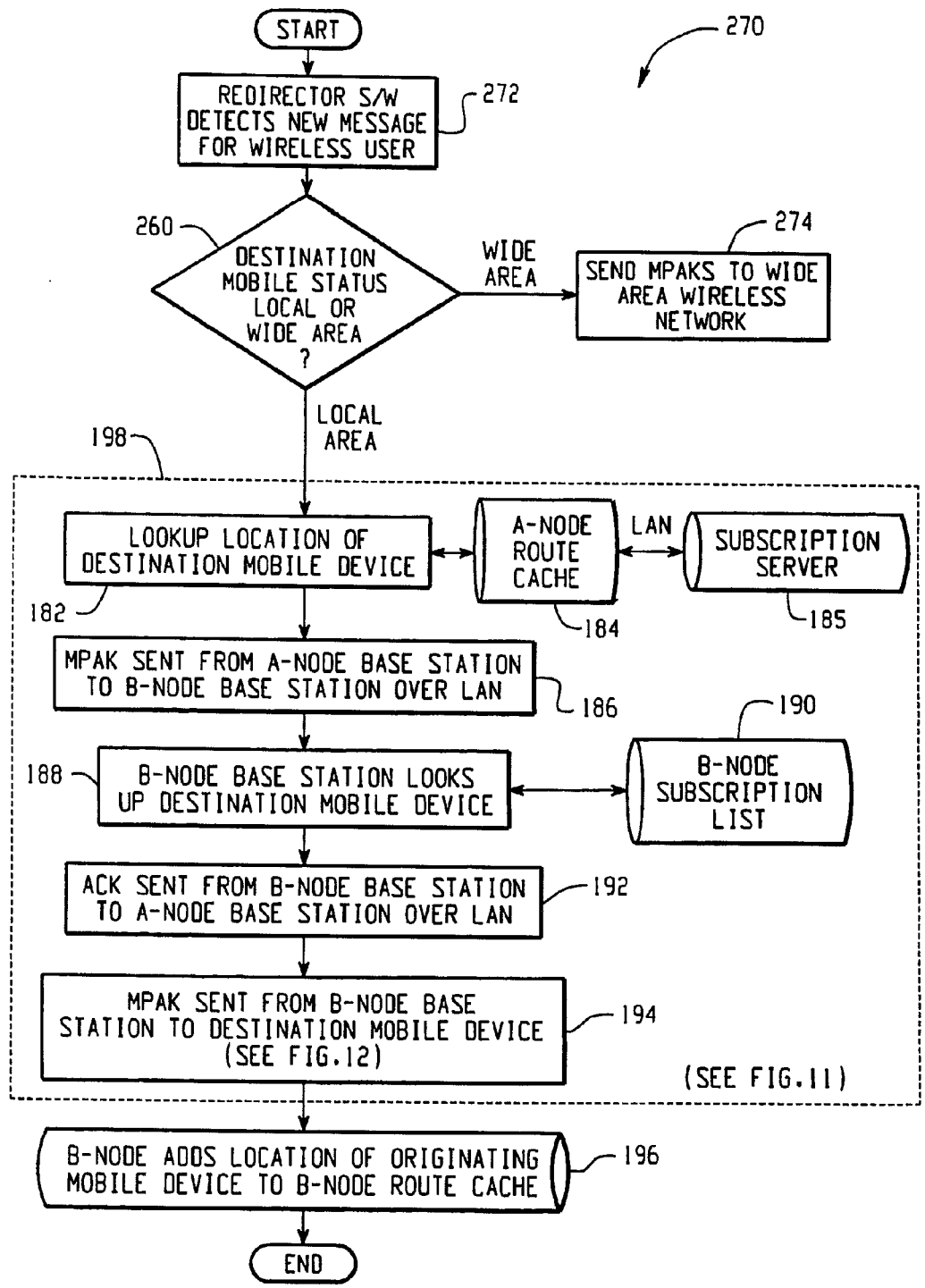
FIG. 14 is a flow diagram showing an exemplary method for processing new e-mail to be delivered to a mobile device.

FIG. 14 is a flow diagram showing an exemplary method 270 for processing new e-mail to be delivered to mobile devices. As described in U.S. Pat. No. 6,219,694, the redirection software 18 monitors the electronic mailboxes of wireless device users based on user configured information and triggering events. If, (1) the redirection software detects a e-mail, and (2) the user has set a redirection trigger, then the message is prepared for wireless transmission (step 272). Then, in step 260, the redirection software module 18 determines whether the destination mobile device was last known to be within the office environment 42. If the mobile device 20 was last contacted in the office environment 42, then the MPAK is routed to a local RF base station as described above with respect to FIGS. 9-12. Otherwise the MPAK is routed over the wide-area wireless network 58 via the Internet 54 (step 274).

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

The invention claimed is:

1. A wireless communication system comprising:
    a plurality of mobile devices;
    a local area network;
    a plurality of local base stations coupled to the local area network, each local base station having a unique address on the local area network and configured to transmit and receive data packets to and from the mobile devices and to transfer the data packets between local base stations over the local area network using the unique address;
    a subscription server operating on the local area network and configured to store data identifying the unique address of the local base station covering each of the mobile devices; and
    a redirection software module operating on the local area network and having access to a wide-area wireless network, and configured to send and receive data packets over the wide-area wireless network to and from mobile devices that are not within range of any of the local base stations;

the subscription server further configured to:
receive a request from one of the local base stations for a routing address of a mobile devices that is a destination of a data packet, the routing address being the unique address of the base station covering the mobile device;
if the subscription server does not have stored the routing address of the destination mobile device, then the subscription server calculates both the time elapsed since the destination mobile device has last been contacted and the number of failed attempts to locate destination mobile device;
if a pre-set time interval has elapsed since the destination mobile device has last been successfully contacted or if a pre-set number of failed attempts to contact the destination mobile device has been exceeded, then the subscription server delivers the data packet to the redirection software module; and
the redirection software module further configured to receive the data packet from the subscription server and to route the data packet to an electronic mailbox associated with the destination mobile device.

2. The system of claim 1 wherein the unique address is an IP address.

3. The system of claim 1 wherein the redirection software module has access to the wide-area wireless network over a wide-area computer network.

4. The system of claim 3 further comprising:
a mail server operating on the local area network and having access to the wide-area computer network, and configured to send and receive data packets to and from the wide-area computer network;
wherein the redirection software module is also configured to send and receive data packets to and from the mail server.

5. The system of claim 1 wherein the wide-area computer network is the Internet.

6. The system of claim 1 wherein the redirection software module is also configured to combine one or more data packets into an electronic message.

7. The system of claim 1 wherein the redirection software module is also configured to transfer electronic messages into an electronic mailbox.

8. The system of claim 1 wherein the subscription server is also configured to log subscription information for each of the mobile devices in the system.

9. The system of claim 8 wherein each local base station includes a subscription list that is arranged to identify the mobile devices currently covered by the particular local base station.

10. The system of claim 9 wherein each subscription list also includes subscription information for the mobile devices currently covered by the particular local base station.

11. The system of claim 1 wherein each local base station includes a route cache that stores data identifying the unique address of local base stations last known to be covering one or more of the mobile devices.

12. The system of claim 11 wherein the route cache included in each local base station is arranged to purge all data relating to any mobile device to which it has not been in communication for a set interval of time.

13. The system of claim 1 wherein one or more of the local base stations comprises a modified personal computer.

14. The system of claim 1 wherein the system is arranged to operate within an office.

15. A method for operating a wireless communication system that includes:
mobile devices;
a local area network;
local base stations coupled to the local area network and having a unique address on the local area network;
a subscription server that operates on the local area network and stores data identifying the unique address of the local base station covering each of the mobile devices; and
a redirection software module operating on the local area network and having access to a wide area wireless network,
the method comprising the steps of: stations;
the local base stations transmitting and receiving data packets to and from the mobile devices and transferring the data packets between local base stations over the local area network using the unique address;
the redirection software module sending and receiving data packets over the wide-area wireless network to and from mobile devices that are not within range of any of the local base stations;
the subscription server receiving a request from one of the local base stations for a routing address of a mobile device that is a destination of a data packet, the routing address being the unique address of the base station covering the mobile device;
if the subscription server does not have stored the routing address of the destination mobile device, then the subscription server calculating both the time elapsed since the destination mobile device has last been contacted and the number of failed attempts to locate destination mobile device;
if a pre-set time interval has elapsed since the destination mobile device has last been successfully contacted or if a pre-set number of failed attempts to contact the destination mobile device has been exceeded, then the subscription server delivering the data packet to the redirection software module; and
the redirection receiving the data packet from the subscription server and to route the data packet to an electronic mailbox associated with the destination mobile device.

* * * * *

UNITED STATES PATENT AND TRADEMARK OFFICE
CERTIFICATE OF CORRECTION

| | | |
|---|---|---|
| PATENT NO. | : 7,986,678 B2 | Page 1 of 1 |
| APPLICATION NO. | : 11/928388 | |
| DATED | : July 26, 2011 | |
| INVENTOR(S) | : Matthias Wandel and Gary P. Mousseau | |

It is certified that error appears in the above-identified patent and that said Letters Patent is hereby corrected as shown below:

Column 13, line 3, claim 1 please replace "routing address of a mobile devices" with -- routing address of a mobile device --

Column 13, line 10, claim 1 please replace "attempts to locate destination" with -- attempts to locate the destination --

Column 14, line 25, claim 15 please delete "stations;" after "steps of:"

Column 14, line 43, claim 15 please replace "attempts to locate destination" with -- attempts to locate the destination --

Signed and Sealed this

Eighteenth Day of October, 2011

David J. Kappos
*Director of the United States Patent and Trademark Office*